United States Patent [19]

Steadman

[11] Patent Number: 4,589,542
[45] Date of Patent: May 20, 1986

[54] CARGO DRIVE UNIT

[75] Inventor: Stephen T. Steadman, Redmond, Wash.

[73] Assignee: The Boeing Company, Seattle, Wash.

[21] Appl. No.: 562,604

[22] Filed: Dec. 19, 1983

[51] Int. Cl.$^4$ ............................................. B65G 13/02
[52] U.S. Cl. ...................................... 198/782; 198/791
[58] Field of Search ............... 198/782, 787, 788, 791, 198/789, 414, 803; 244/137 R; 104/135, 168, 38, 43, 45

[56] References Cited

U.S. PATENT DOCUMENTS

| | | | |
|---|---|---|---|
| 1,689,160 | 10/1928 | Siegrist | 104/38 |
| 2,937,553 | 5/1960 | Sherman | 198/414 X |
| 3,100,039 | 8/1963 | Oderman et al. | 198/414 |
| 3,391,474 | 7/1968 | Hays, Jr. | 198/803 |
| 3,418,943 | 12/1968 | Teters | 104/45 |
| 3,525,233 | 2/1971 | Hinman | 198/782 |
| 3,978,975 | 9/1976 | Herbes et al. | 198/782 |

FOREIGN PATENT DOCUMENTS 11565  1/1977  Japan ................................... 198/414

Primary Examiner—Joseph E. Valenza
Assistant Examiner—Michael Stone
Attorney, Agent, or Firm—H. Gus Hartmann; B. A. Donahue

[57] ABSTRACT

A floor mounted power drive unit for moving containerized cargo or pallets within a cargo airplane; and the cargo drive unit generally comprises, a rotatable wheel or roller which is both steerable and retractable, and which is of modular construction for ease of insertion into a mounting opening in the floor of the cargo compartment with the only interface being a torque reaction means and an electrical connection.

2 Claims, 6 Drawing Figures

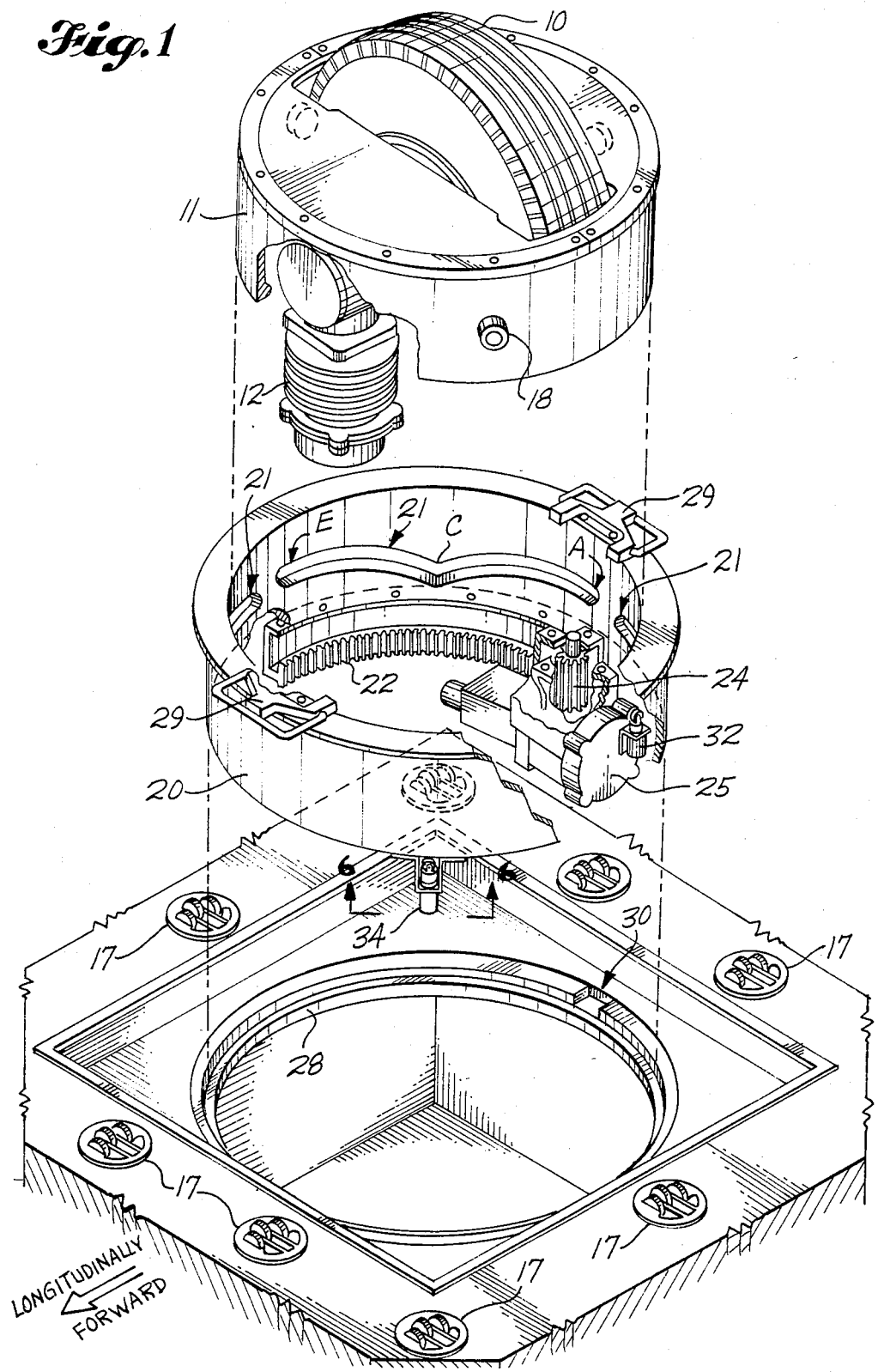

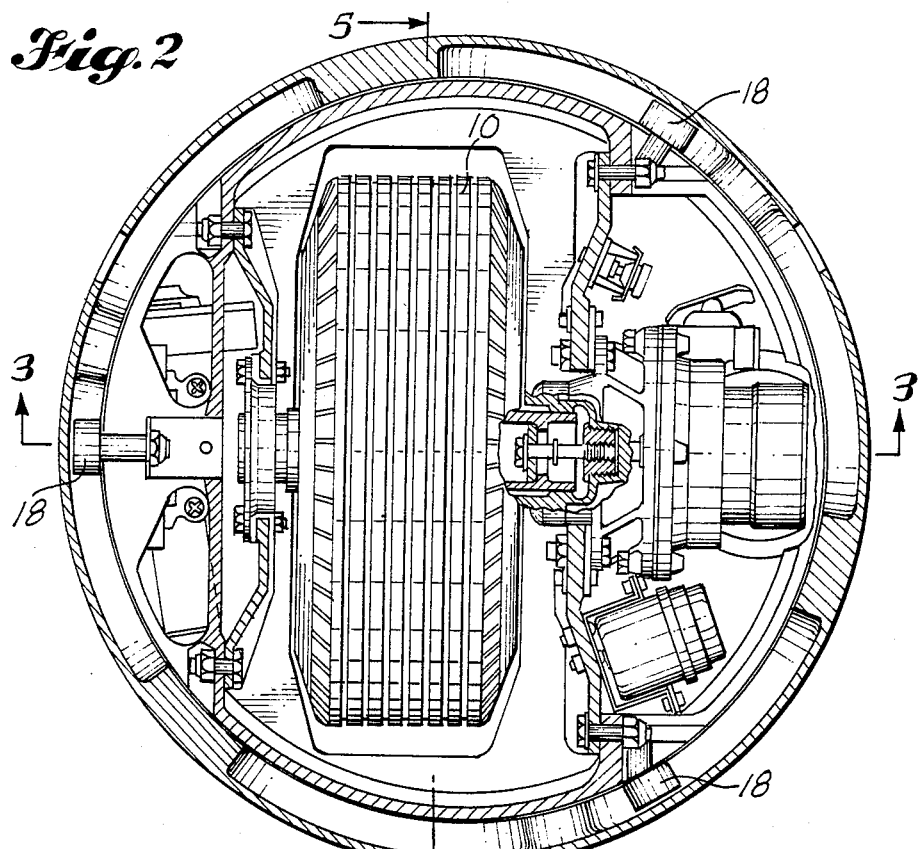
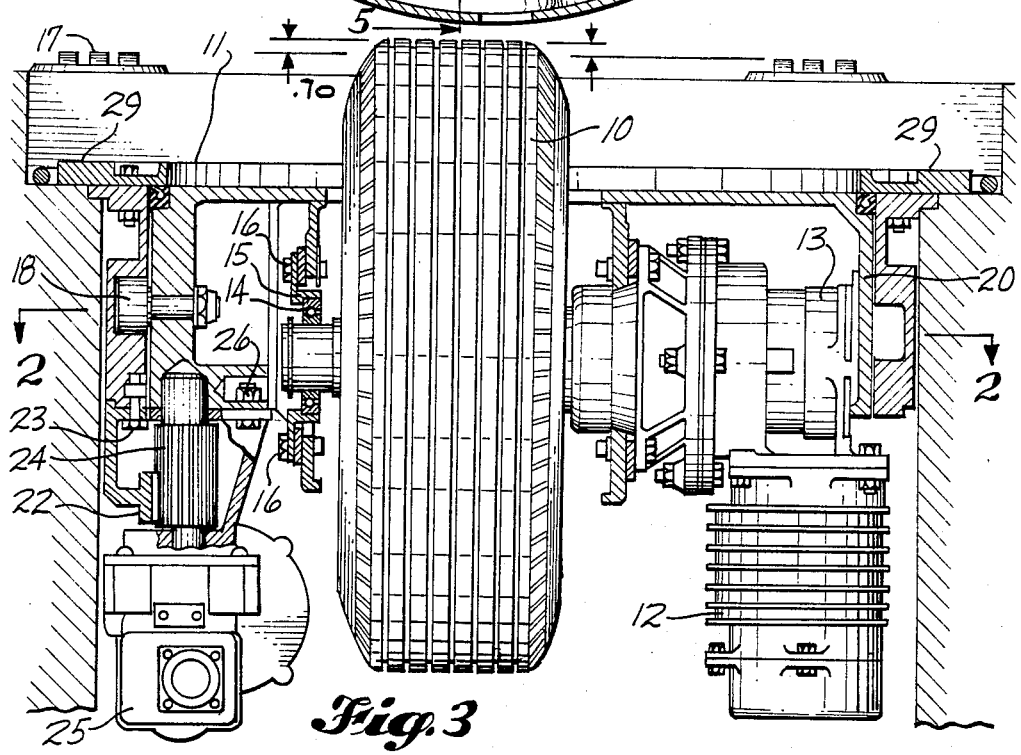

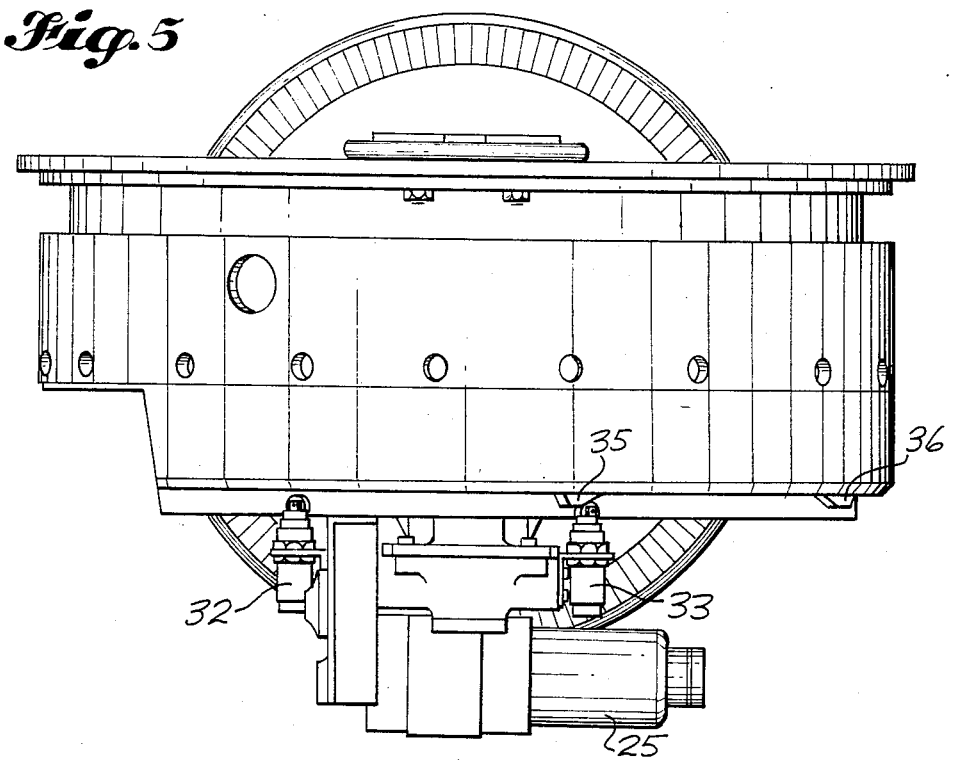
Fig. 5
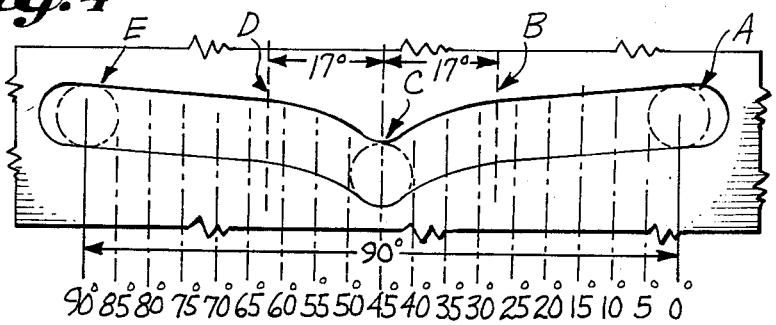
Fig. 4
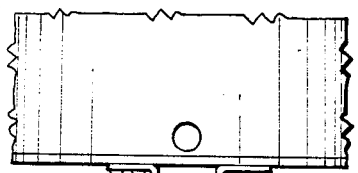
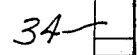
Fig. 6

CARGO DRIVE UNIT

BACKGROUND OF THE INVENTION

1. Field of the Invention

The invention relates to cargo handling and particularly to the horizontal movement of cargo containers and pallets, in various directions, over the floor of an aircraft; and wherein retractable power driven wheels or tires are raised for engaging the undersurface of the cargo containers and pallets.

2. Description of the Prior Art

The subject matter of this application is related to the subject matter of U.S. Pat. No. 3,978,975 by Herbes et al issued Sept. 7, 1976. The patented power drive unit uses a double cam arrangement, wherein, one of the cams is fixedly mounted to airplane structure. Tolerance control between the interface of the power drive unit and mating hardware mounted on airplane structure results in functional reliability problems and difficulty in adjusting the mating hardware.

The device defined by this application is a self-contained mechanism of modular construction, that is designed to be inserted into an annular opening in the floor of the airplane, with the only airplane interface requirement being a torque reaction fitting and an electrical connection.

SUMMARY OF THE INVENTION

The invention relates to the handling of containerized cargo and cargo pallets, and more particularly to a power drive unit capable of maneuvering cargo along the floor, such as the floor of an aircraft. A powered wheel or roller makes frictional engagement with the underside of the cargo and through a steering mechanism which functions to change the direction of cargo movement, the cargo can be loaded laterally through the side-door entrance of an airplane fuselage and then moved longitudinally within the cargo compartment.

The power drive unit is a self contained unit that can be removed for bench adjustment of limit switches and maintenance; and this improves the airplane down time caused by interface and tolerance control problems.

An advantage of the invention is its unique modular feature that permits it to be dropped into a mating ringed hole in the floor, with a simple static interface with airplane structure and this minimizes dynamic operational problems.

BRIEF DESCRIPTION OF THE DRAWINGS

FIG. 1, is an isometric view of the powered wheel drive unit of the present invention, shown in an exploded arrangement and with respect to its mounting into floor structure.

FIG. 2, is a plan view of the powered wheel drive unit.

FIG. 3, is a side elevation view taken in the direction indicated by 3—3 of FIG. 2.

FIG. 4, is a developed flat view of one of the typical cam track profiles.

FIG. 5, is a side elevation view taken in the direction indicated by 5—5 of FIG. 2.

FIG. 6, is a side elevation schematic view of a limit switch taken in the direction indicated by 6—6 of FIG. 1.

DESCRIPTION OF THE PREFERRED EMBODIMENTS

FIGS. 1 to 3 show in detail the components of the Power Drive Unit (PDU) assembly of this invention which engages the undersurface of containerized cargo and cargo pallets for moving the cargo in various directions. A roller or wheel 10 is mounted in a support housing or inner ring 11; and the wheel 10 is rotatably driven by a motor 12 through right-angle gearing 13.

To accommodate wheel height differences, the wheel 10 is mounted to the inner ring 11 through wheel bearings 14 and a vertical height adjustment plate 15 which is fastened by bolts 16 to inner ring 11. This arrangement permits vertical height adjustment of the wheel 10 above the top plane of caster rollers 17, thereby controlling the amount that a tire print or wheel 10 frictionally engages cargo undersurface.

The inner ring 11, which carries the wheel 10 and its drive motor 12, has a series of three cam follower bearings or rollers 18 arrange symmetrically around its outer periphery. The inner ring 11 is insertingly mated or interfaces with a stationary outer flanged ring 20 having a series of three alike cam profiles 21 arranged symmetrically around on its inner periphery; and each of the cam tracks or profiles 21 is engaged by a cam follower roller 18 of the inner ring 11. The cam tracks or profiles 21 are slots cut part way into the inner peripheral wall of the outer ring 20, i.e., the cam slots are not cut all the way through the wall thickness of the outer ring 20. The outer ring 20 also has a ring gear segment 22 fixedly fastened through bolts 23, to the skirt thereof. The ring gear segment 22 is engaged by a pinion gear 24 which is driven by motor 25 mounted through bolts 26 to the skirt of the inner ring 11.

Referring to FIG. 1, when the inner ring 11 is assembled into and mated with the outer ring 20, the pinion gear 24 engages ring gear segment 22 for rotatably driving the inner ring 11 relative to the outer ring 20.

When the outer ring 20 is vertically lowered into a mating ring support 28 in the floor opening, the tangs 29 on the outer ring 20 are inserted into slots 30 of the mating ring support 28 for reacting the torque of outer ring 20 thereby maintaining it stationary.

The PDU is generally installed in combination with a whole series of caster rollers 17 adjacent thereto, for supporting a major portion of the cargo load. The height of the wheel 10 above the cargo deck or top of the caster roller plane, in the raised position, is determined by both the vertical height adjustment plate 15 shown in FIG. 3 and the cam profile shown in FIG. 4.

FIG. 4 is a developed layout of the cam track profile which functions to vary the vertical height of the wheel 10 as the directional orientation of the wheel 10 about a vertical axis is changed. The sequential operation of the PDU from directional orientation points A through E, shown in the cam track profile of FIG. 4, will be described with reference to the figures and related to the operation of the PDU for moving a cargo container laterally, such as through a side doorway opening in the fuselage of an airplane, and then longitudinally within the fuselage.

Since the cam followers 18 are fixed to the inner ring 11, which also serves as the housing for the wheel 10, the movement of the cam followers in a horizontal plane from cam track profile points A to E, represents a 90° (ninety degree) steering change or change in the directional drive alignment of the wheel 10. The movement of the wheel 10 in a vertical plane is directly related to the vertical movement of the cam followers 18 in the cam track profile.

Assume that the fully raised position of the wheel 10, shown in FIGS. 1, 2, and 3, represents the initial position A of the cam track profile shown in FIG. 4, and also represents the directional drive alignment of the wheel 10 in the entry area of the side doorway of the airplane fuselage for moving the cargo container laterally, either into or out of fuselage cargo compartment, depending upon the direction of drive wheel rotation. The fully raised position of the wheel 10 places the top of the wheel, shown in FIG. 3, approximately 0.7 inches above the top of the caster roller plane and depending upon wheel size and tire inflation pressure, would be capable of applying a vertical load of approximately 2,000 lbs. when the wheel is depressed to the top plane of the caster rollers.

Initial directional realignment movement of the wheel 10 from cam track profile point A to point B, representing an arc. of approximately 28°, is accomplished by pinion gear 24 reacting with fixed gear segment 22 which results in a rotational movement of inner ring 11 relative to the stationary outer ring 20. This causes the cam follower to move along the cam profile from points A to B resulting in a controlled linear lowering of the wheel of approximately 0.3 inch; whereat, the top of the tire, in an unloaded condition, would be approximately 0.4 inches above the top plane of the caster rollers 17.

Continued motion of the cam follower along the cam track profile from point B to C, which represents an arc of approximately 17°, results in directional alignment of the wheel 10 towards a 45° position; and due to a steep downwardly sloping cam track profile from point B to C, the wheel decends rapidly to its maximum lowered position, at which it has dropped a total vertical distance of 1.2 inches from its initial position at point A. At point C, the top of the wheel 10 is approximately 0.5 inches below the top of the caster roller plane; thereby, leaving the cargo container fully supported on the caster rollers for manual handling thereof. This cargo disengagement position at point C of 45° allows a symmetrical cam profile which results in symmetrical steering forces on either side of the tire unloaded position at point C. Therefore, due to the symmetrical cam design, the continued movement of the cam follower from the 45° position at point C, through point D, towards the 90° position at point E, will result in a reversal of the operation thus far described. At position E of the cam track profile, the wheel 10 is at a fully raised position and the drive alignment of the wheel is such that the cargo container can be moved longitudinally within the fuselage.

The 90° arc of directional alignment of the wheel 10 and its vertical travel, is regulated by the horizontal length and profile of the cam track; and this can be changed by redesigning the slot length and its cam profile.

Referring to FIGS. 1 and 3, the overall vertical length of pinion gear 24 or its gear width, is such as to accommodate the vertical motion of the inner ring 11 relative to the stationary outer ring 20, while maintaining a gear meshing relationship with the outer ring gear segment 22, throughout the directional alignment cycle of the wheel 10. During this 90° directional change of the wheel 10, the meshing engagement of the pinion gear 24 to the ring gear segment 22, undergoes a combination of: rolling involute contact, which is typical for any spur gear mesh; and an axial sliding contact, which is dictated by the shape of the cam slot 21 cut into the inner wall of the outer ring 20. This unique action allows the wheel steering load reactions to be completely contained within the PDU envelope, thus avoiding external load path support structure for the steering motor; thereby, providing an improved structural efficiency from the standpoint of overall system weight and stiffness. Torsional loads generated during the steering mode, are transmitted into cargo deck floor fittings by the tangs 29 mounted on the outer ring 20. Horizontal loads generated by the powered drive wheel 10 during movement of cargo containers or pallets, are carried by the bearing surfaces formed between the close fitting of the inner ring 11 and the outer ring 20, and then into floor structure. This close fitting relationship also controls the gear engagement or meshing relationship between the pinion gear 24 and the ring gear segment 22. Vertical loads of the PDU are carried between the inner rignt 11 and the outer ring 20, through the three cam rollers 18 equally spaced and mounted to the inner ring 11, which rollers mate with the three cam slots 21 cut into the outer ring 20.

Referring to FIGS. 5 and 6, limit switches 32, 33, and 34, are independently mounted within the PDU module for controlling the angular position logic and directional alignment in a horizontal plane of the drive wheel 10. Two of the limit switches 32 and 33, are mounted to the housing of the pinion gear drive motor or steering motor 25, for controlling the 0° and 90° positions of the wheel 10. The limit switches 32 and 33, are spaced apart on either side of the pinion gear 24 and are actuated when they engage projections or cam lobes 35, 36 mounted to the underside or skirt of the ring gear segment 22. The 1.2 inch vertical motion of the steering motor 25 which occurs during a 90° excursion of the inner ring 11, ensures that switch 32 has clearance with cam lobe 35 and switch 33 has clearance with cam lobe 36.

A third limit switch 34, shown in FIG. 6, is mounted on a bracket on the underside or skirt of the outer ring 20, for controlling the 45° position of the wheel 10. Limit switch 34 is actuated by the vertical motion of the inner ring 11 which reaches its lowest point at the 45° position.

Interface tolerance control problems are generally caused by PDU's, such as shown in U.S. Pat. No. 3,978,975, wherein the wheel alignment limit switches are mounted to fixed airplane structure and their adjustment is made with the PDU inserted into a mating ring support in the floor of the airplane. This also causes a functional reliability problem due to the difficulty in adjusting the individual limit switch settings.

Whereas, in the present invention, the switching logic for controlling the angular position or directional alignment of the wheel 10, is contained entirely within the PDU module and adjustment of the limit switches 32, 33, and 34 is accomplished with the PDU module completely removed and adjusted on the bench; thereby, eliminating the prior known interface problems associated with adjusting each individual limit switch mounted to fixed airplane structure.

I claim:

1. A powered drive wheel module for insertion into a mating support opening in the floor structure of an airplane and functioning to move cargo in a horizontal plane, comprising: a wheel mounted on an axle; an inner ring member for supportably housing the wheel and axle; power means mounted to said inner ring member, for rotatably driving the wheel about a horizontal axis; an outer ring member non-rotatably and removably mounted within the mating support opening in the floor structure; a cam system interposed between the inner ring member and the outer ring member, for supportably mounting the inner ring member for rotation within the stationary outer ring member; a ring gear segment fixedly connected to the skirt of the outer ring member; a powered pinion gear mounted to said inner ring member for meshing with the ring gear segment, to rotate the inner ring member relative to the stationary outer ring member; steering limit switches interposed between the inner ring member and the outer ring member for angular logic control of the powered drive wheel and for directional orientation change of the horizontal driving force of the wheel; said steering limit switches being independently adjustable, with the powered drive wheel module completely removed from the mating support opening in the floor structure, thereby minimizing tolerance and interface control problems; and said cam system, through rotation of the ring gear segment by said powered pinion gear, vertically positioning the wheel to a raised position for maximum frictional engagement with the undersurface of cargo positioned thereon to move it in a horizontal direction, and a lowered position for complete disengagement with the undersurface of cargo; said outer ring having abutment means projecting outwardly which is received in at least one complimentary recess for preventing rotation of the outer ring about a vertical axis relative to the floor structure forming the mating opening whereby removal of the outer ring from the floor structure results in removal of the powered wheel module including the means to vertically position and provide angular position logic control of the wheel.

2. The powered drive wheel module as set for in claim 1, wherein said sterring limit switches, comprises: a first steering limit switch for controlling a zero degree angular position of the wheel; a second steering limit switch for controlling a ninety degree angular position of the wheel; and a third steering limit switch, actuated by vertical motion of the inner ring member, for controlling a forty five degree angular position of the wheel.

* * * * *